United States Patent
Liu et al.

(10) Patent No.: US 8,582,985 B2
(45) Date of Patent: Nov. 12, 2013

(54) INPUT ISOLATION OF A TRANSIMPEDANCE AMPLIFIER IN OPTICAL RECEIVERS

(75) Inventors: Frankie Y. Liu, Palo Alto, CA (US); Dinesh D. Patil, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 13/157,165

(22) Filed: Jun. 9, 2011

(65) Prior Publication Data

US 2012/0315052 A1    Dec. 13, 2012

(51) Int. Cl.
*H04B 10/06*    (2011.01)
*H04B 10/69*    (2013.01)

(52) U.S. Cl.
CPC .................... *H04B 10/695* (2013.01)
USPC ........................... 398/202; 398/37

(58) Field of Classification Search
USPC ........................ 398/9, 37, 202, 208
See application file for complete search history.

(56) References Cited

U.S. PATENT DOCUMENTS

| 8,290,726 | B2* | 10/2012 | Schmidt et al. | 702/58 |
| 2010/0272448 | A1* | 10/2010 | Kubo | 398/202 |
| 2011/0188864 | A1* | 8/2011 | Uo | 398/154 |

* cited by examiner

*Primary Examiner* — Dalzid Singh
(74) *Attorney, Agent, or Firm* — Park, Vaughan, Fleming & Dowler LLP; Steven E. Stupp

(57) ABSTRACT

An optical receiver is described. This optical receiver has two operating modes: a calibration mode and a normal mode. During the normal mode, switches are used to electrically couple an input of a transimpedance amplifier (TIA) to an optical-to-electrical (OE) converter that receives an optical signal and provides a corresponding analog electrical signal. Moreover, during the calibration mode, the switches are used to electrically isolate the input of the TIA from the OE converter while maintaining a feedback path from an output of the TIA to the input of the TIA, thereby ensuring proper bias of the TIA during calibration. Furthermore, a frequency response of the TIA during the normal mode is substantially unchanged over an operating bandwidth of the TIA by the capability to electrically isolate the input of the TIA from the OE converter during the calibration mode.

20 Claims, 10 Drawing Sheets

┌─────────────────────────────────────────────────────────┐
│ DURING THE NORMAL MODE OF AN OPTICAL RECEIVER, AN INPUT OF A *TIA* │
│ IN THE OPTICAL RECEIVER IS ELECTRICALLY COUPLED TO AN *OE* │
│ CONVERTER IN THE OPTICAL RECEIVER │
│ 1110 │
└─────────────────────────────────────────────────────────┘
                              ↓
┌─────────────────────────────────────────────────────────┐
│ DURING THE CALIBRATION MODE OF THE OPTICAL RECEIVER, THE INPUT OF │
│ THE *TIA* IS ELECTRICALLY ISOLATED FROM THE *OE* CONVERTER WHILE │
│ MAINTAINING A FEEDBACK PATH FROM AN OUTPUT OF THE *TIA* TO AN INPUT │
│ OF THE *TIA*'s AMPLIFIER │
│ 1112 │
└─────────────────────────────────────────────────────────┘

FIG. 11

INPUT ISOLATION OF A TRANSIMPEDANCE AMPLIFIER IN OPTICAL RECEIVERS

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to optical receivers. More specifically, the present disclosure relates to optical receivers in which inputs to a transimpedance amplifier can be isolated during a calibration mode.

2. Related Art

As illustrated in FIG. 1, a typical existing optical receiver includes an optical-to-electrical (OE) converter that receives an optical signal, and which generates a corresponding electrical signal. Then, an amplification chain converts the electrical signal into digital voltage levels.

For example, a common OE converter is a photodetector (PD). It converts an incoming optical signal to a current ($i_{RD}$). This current is converted to a voltage by a transimpedance amplifier (TIA). In turn, the small voltage swing from the TIA's output ($V_O$) is converted into digital signal levels (digital out) through several stages of amplification (amp. chain). Note that the modular integration of a PD on a separate substrate from the CMOS modules using an electrical interconnect usually introduces a large parasitic capacitance ($C_{PD}$ in FIGS. 2A and 2B) that can limit the operating bandwidth of the optical receiver.

In order to properly set the operating conditions of the electrical amplification stages during a calibration mode, it is often useful to isolate the TIA from the input current, $i_{PD}$. As shown in FIGS. 2A and 2B, in an existing optical receiver, this isolation can be achieved by inserting a switch along the path from the PD to the TIA. When the switch becomes opaque, no current flows through the switch, and as a consequence the TIA sees no input current, henceforth referred to as the 'zero-current input condition'. However, this isolation technique has several drawbacks. Notably, the performance of the optical receiver may be degraded by the added parasitic resistance and capacitance associated with the introduction of such a switch.

Consider the path from the PD to the TIA as an electrical node. The time constant at which this node can charge and discharge is determined by the impedance seen at this node, which is set by the capacitance and the resistance of this node to ground. In particular, the RC time constant is the product of the dominant capacitance, $C_{PD}$, and the resistance seen by this capacitor. Note that large capacitance and large resistance values imply a large RC time constant, and a large RC time constant implies that the optical receiver responds slowly to changing input data.

Given a predefined value of $C_{PD}$, the equivalent resistance seen at this node is constrained by a frequency-response target (i.e., a desired RC time constant). Therefore, based on the technology, power limitations, and noise considerations, the equivalent input impedance of the TIA may have a narrow range of acceptable values. In this range, the additional series resistance associated with the introduction of an isolation switch between the PD and the TIA (as shown in FIGS. 2A and 2B) may significantly deteriorate the performance of the optical receiver.

The degradation in the frequency response of the optical receiver through the introduction of a series resistance is illustrated using the simplified circuit shown in FIG. 3B (which corresponds to the existing optical receiver shown in FIG. 3A). Denoting the parasitic capacitance $C_{PD}$ in this circuit as $C_{large}$ and the TIA's equivalent input impedance ($R_{TIA}$) as $R_{small}$, which is approximately the resistance $R_f$ in the TIA's feedback path divided by the TIA's gain A. Note that the qualifiers 'large' and 'small' indicate the relative values of these components from a designer's perspective. In general, $C_{large}$ is 50 to 100× larger than the typical logic gate capacitance, and $R_{small}$ is 10 to 20× smaller than the typical 'on' logic gate resistance.

As shown in FIGS. 4A and 4B, from a resistance perspective, if a switch is added between the TIA and the PD, the RC time constant increases to $C_{large} \cdot (R_{small} + R_{switch})$, where $R_{switch}$ is the equivalent resistance of the switch. If $R_{switch}$ is large compared to $R_{small}$, $R_{switch}$ can significantly degrade the frequency response. To lower $R_{switch}$, the width of the switch can be increased, but increasing the size of the switch adds additional parasitic capacitance so that the RC time constant may still be degraded. A more complete expression for the RC time constant includes this effect, i.e., $(C_{large} + C_{switch}) \cdot (R_{small} + R_{switch})$, where $C_{switch}$ is the equivalent capacitance of the switch. Consequently, because there is a tradeoff between $R_{switch}$ and $C_{switch}$, there is an optimal size for the switch which minimizes the RC time constant. But even at this minimum value, the degradation in the frequency response of the optical receiver may not be acceptable.

Another technique that is used to provide DC isolation and to allow for independent DC biasing of the TIA (so that the operating condition can be set at a desirable point) includes AC coupling the PD to the input of the TIA. For example, the PD may be capacitively coupled to the input of the TIA. However, because of this AC coupling, data communicated to the optical receiver by an optical transmitter may need to be DC balanced, and may also need to have enough transitions so that the time between transitions is small compared with the relevant time constants at the optical receiver. These requirements may increase the overhead with a commensurate degradation in the effective data rate.

Alternatively, the output from the TIA can be averaged using an RC filter. The average of the output may be used as a common-mode reference for $i_{PD}$, i.e., it can provide a fixed DC input to the TIA. However, this technique does not provide true isolation, and may also require that DC-balanced data be communicated to the optical receiver by an optical transmitter. In addition, the averaging may introduce additional problems, including: residual ripple (i.e., the averaging may not be perfect); the averaging circuit may contribute undesirable parasitics along the signal path; and the averaging may behave poorly when the input signal is saturated.

Hence, what is needed is an optical receiver without the above-described problems.

SUMMARY

One embodiment of the present disclosure provides an optical receiver that includes: an optical-to-electrical (OE) converter that receives an optical signal and provides an analog electrical signal, and a transimpedance amplifier (TIA), electrically coupled to the OE converter, having a normal mode and a calibration mode. It also includes a decision circuit, electrically coupled to the TIA, that determines a digital electrical signal from the analog electrical signal, and control logic, electrically coupled to the TIA, configured to provide a signal that specifies an operating mode of the TIA, where the operating mode is one of the following: normal mode and calibration mode. During the normal mode, the TIA electrically couples the OE converter to the input of the TIA. In contrast, during the calibration mode, the TIA input is electrically isolated from the OE converter while retaining a feedback path from an output of the TIA to an input of the TIA, thereby ensuring proper bias of the TIA during calibration. Furthermore, the frequency response of the TIA during the normal mode is substantially unchanged over an operating bandwidth of the TIA by the capability to electrically isolate the input of the TIA from the OE converter during the calibration mode.

The feedback path may include a feedback resistance, and the TIA may include: a first switch between the input side of the feedback resistance and a first node, which is electrically coupled to the OE converter and to the input of a second switch; a second switch between the first node and the input of the TIA's amplifier; and a third switch between the input of the TIA's amplifier and the input side of the feedback resistance.

Note that a change in the frequency response associated with electrically isolating the input of the TIA from the OE converter during the calibration mode may correspond to the added resistance associated with the first switch divided by the gain of the TIA's amplifier.

In some embodiments, the first switch is different than the second switch. Moreover, a resistance associated with the first switch plus the feedback resistance may equal a predetermined value so that a gain of the TIA is unaffected by the first switch. Furthermore, the pole associated with the resistance of the second switch and the input of the TIA's amplifier may be set at a frequency that is an order of magnitude larger than the lowest pole of a closed-loop transfer function associated with the optical receiver.

During the calibration mode, the first switch and the second switch may be opaque, and the third switch may be transparent. Furthermore, during the normal mode, the first switch and the second switch may be transparent, and the third switch may be opaque. Additionally, during the calibration mode, the control logic may adjust bias settings so as to cancel the offsets in the decision circuits and a predefined optical signal may be transmitted so that the control logic may adjust the biasing of the TIA to center the output of the TIA. For example, the predefined data pattern may correspond to: a current approximately midway between a minimum and a maximum current output by the OE converter, an alternating one-zero pattern, and/or another pre-determined pattern.

In some embodiments, a capacitance associated with the third switch is smaller than a capacitance associated with the input.

Furthermore, during the normal mode, the input of the TIA may be DC coupled to the OE converter.

Another embodiment provides a system that includes the optical receiver.

Another embodiment provides a method for calibrating and biasing the optical receiver. In this method, during the normal mode the input of the TIA is electrically coupled to the OE converter. Moreover, during the calibration mode, the input of the TIA is electrically isolated from the OE converter while maintaining the feedback path from the output to the input of the TIA's amplifier, thereby ensuring proper bias of the TIA during calibration. Note that the frequency response of the TIA during the normal mode is substantially unchanged over an operating bandwidth of the TIA by the capability to electrically isolate the input of the TIA from the OE converter during the calibration mode.

BRIEF DESCRIPTION OF THE FIGURES

FIG. 11 is a flow chart illustrating a method for calibrating and biasing an optical receiver in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
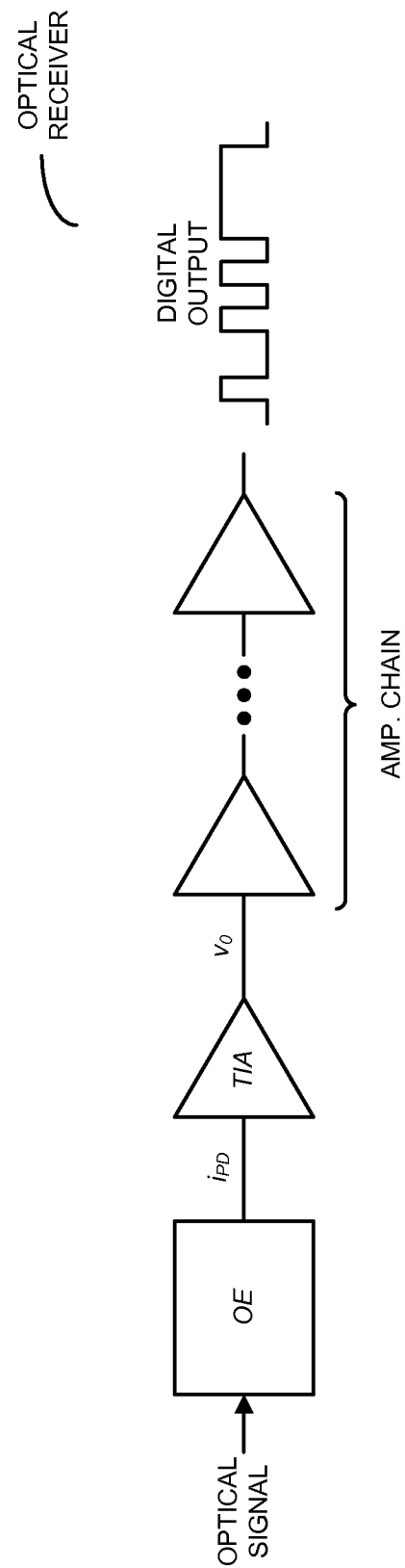
FIG. 1 is a block diagram illustrating an existing optical receiver.

Embodiments of an optical receiver, a system that includes the optical receiver, and a technique for calibrating and biasing the optical receiver are described. This optical receiver has two operating modes: a calibration mode and a normal mode. During the normal mode, switches are used to electrically couple an input of a transimpedance amplifier (TIA) to an optical-to-electrical (OE) converter that receives an optical signal and provides a corresponding analog electrical signal. Moreover, during the calibration mode, the switches are used to electrically isolate the input of the TIA from the OE converter while maintaining a feedback path from an output of the TIA to the input of the TIA, thereby ensuring proper bias of the TIA during calibration. Furthermore, a frequency response of the TIA during the normal mode is substantially unchanged over an operating bandwidth of the TIA by the capability to electrically isolate the input of the TIA from the OE converter during the calibration mode.

By selectively isolating the input of the TIA, this calibration and biasing technique allows the input current to the TIA to be absent when setting the biasing of the TIA. Consequently, this technique allows the optical receiver to be calibrated and biased without requiring that an optical transmitter provide an optical signal corresponding to a DC-balanced data pattern or, if the input of the TIA is AC coupled to the OE converter during the calibration mode, without requiring that the optical transmitter provide an optical signal corresponding to an all 1 s or an all 0 s data pattern. In addition to eliminating overhead associated with such data patterns, the need for coordination between the optical transmitter and the optical receiver during calibration is eliminated. Thus, the calibration and biasing technique can improve the performance of, and reduce the cost and the complexity, of a system that includes the optical receiver.

In the discussion that follows, 'calibrating' the optical receiver should be understood to include adjusting the bias voltages or currents in the optical receiver, including bias conditions for the decision/data slicer circuitry. More generally, 'calibrating' the optical receiver should be understood to include determining any settings and/or conditions that are provided or satisfied in order to achieve improved or optimal performance and/or proper operation of the TIA, as well as proper operation of stages in the optical receiver that are further downstream from the TIA. These adjustments may correct for offsets and result in sufficient gain to ensure that the output voltages from the optical receiver correctly correspond to a logical '1' or a logical '0' in correspondence to the data encoded in the optical signal that is converted to an electrical signal via the OE converter. While communication of binary data is used as an illustrative example, in other embodiments more-than-two-level data can be transmitted using the optical receiver and/or the system.

We now describe embodiments of the optical receiver. This optical receiver may use the TIA topology to relax the tradeoff between the isolation switch resistance and the switch capacitance in optical receivers. This approach leverages the Miller effect in the TIA, i.e., the equivalent impedance between two nodes whose potentials are related by the gain of the TIA's amplifier.

Figure 5:
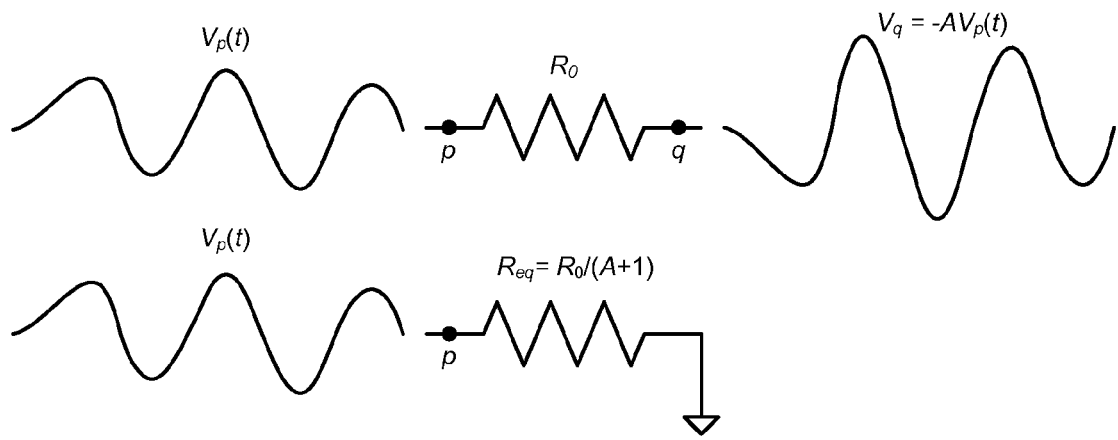
FIG. 5 is a block diagram illustrating the Miller effect in accordance with an embodiment of the present disclosure.

The Miller effect is illustrated in FIG. 5, which is used by the TIA to reduce the equivalent input impedance. Consider a resistor between two nodes, p and q, where node p represents the input node and node q represents the surrogate node. The current that flows through the resistor ($R_0$) is given by $i_{pq} = (V_p - V_q)/R_0$, where $V_p$ and $V_q$ are the two node potentials, and $i_{pq}$ is the current that flows from node p to node q. If $V_q$ is allowed to vary proportionally with $V_p$, for example as $V_q = -A \cdot V_p$, where A is the gain through the TIA's amplifier, then the current can be expressed as $i_{pq} = V_p \cdot (A+1)/R_0$, i.e., the equivalent impedance looking into node p from the left is given by $R_{eq} = R_0/(A+1)$. The Miller effect, together with the small penalty in the TIA gain ($R_0 A/(A+1) \approx R_0$), explain the popularity of this topology. Expressed in other terms, for large A, the time constant is effectively reduced by A, for essentially the same TIA gain: time constant $R \cdot C \rightarrow R_{eq} \cdot C \approx R_0 \cdot C/A$, and gain $R \rightarrow R_0 A/(A+1) \approx R_0$.

Figure 6:
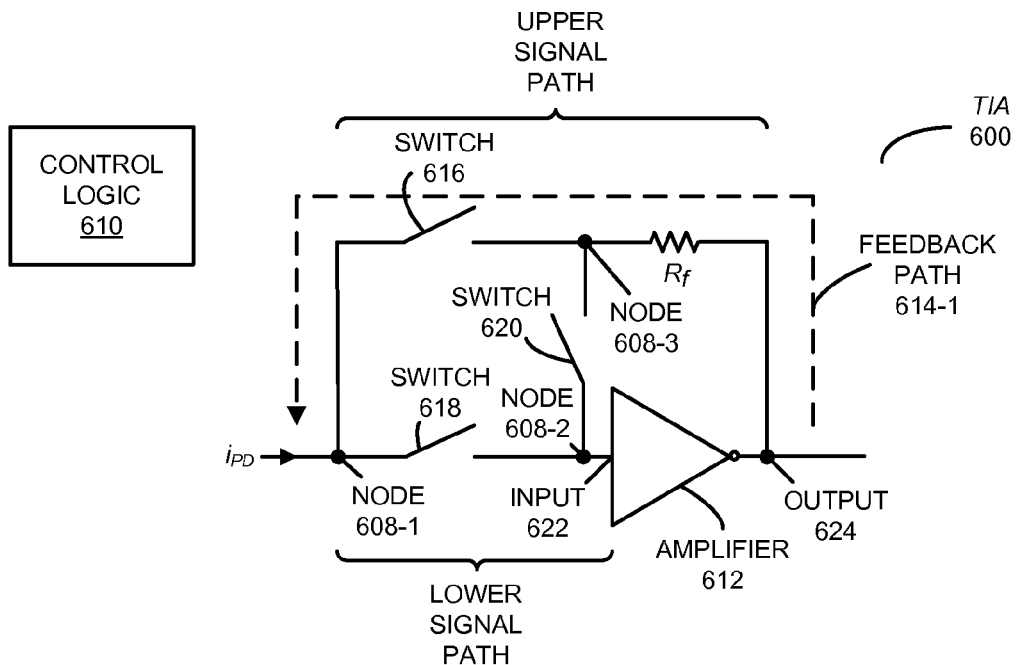
FIG. 6 is a block diagram illustrating a front end of a transimpedance amplifier (TIA) in accordance with an embodiment of the present disclosure.

The Miller effect, or more specifically, the reduction in the effective impedance, can be exploited in an input isolation scheme. In particular, because of the Miller effect, the effective resistance of a switch along the feedback loop of the TIA is reduced by the TIA's amplifier gain. This is shown in FIG. 6, which presents a block diagram illustrating a TIA 600, which may be used in an optical receiver (as well as other applications). This TIA has two operating modes, a normal mode and a calibration mode, which respectively may be specified by one or more signals provided by control logic 610. TIA 600 includes 'isolation' switch 616 along the upper signal path (between nodes 608-1 and 608-3), 'isolation' switch 618 along the lower signal path (between nodes 608-1 and 608-2), and a 'bridging' switch 620 (between nodes 608-2 and 608-3).

Figure 7A:
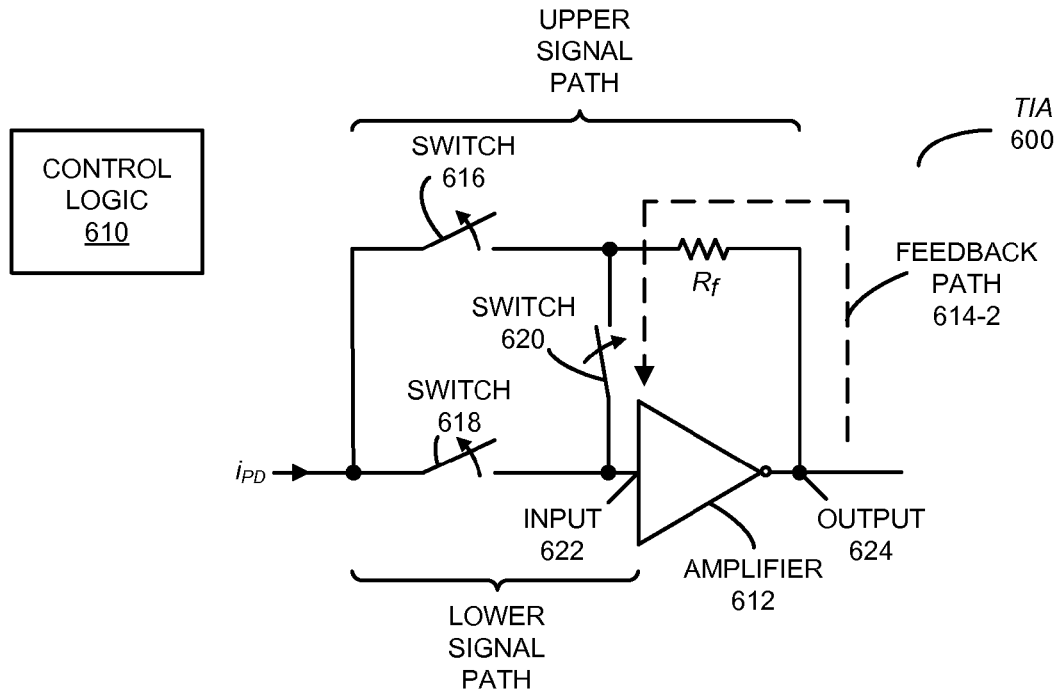
FIG. 7A is a block diagram illustrating the TIA in FIG. 6 during the calibration mode in accordance with an embodiment of the present disclosure.

As shown in FIG. 7A, which presents a block diagram of TIA 600, during the calibration mode isolation switches 616 and 618 become opaque to isolate the upper signal path and the lower signal path from input 622 of amplifier 612 (and, thus, from OE converter, i.e., the zero-current condition). Furthermore, bridging switch 620 becomes transparent to electrically couple the upper signal path and the lower signal path, which maintains a feedback path 614-2 from an output 624 of TIA 600 to input 622 of the TIA's amplifier 612, and which ensures proper bias of TIA 600 during calibration.

Figure 7B:
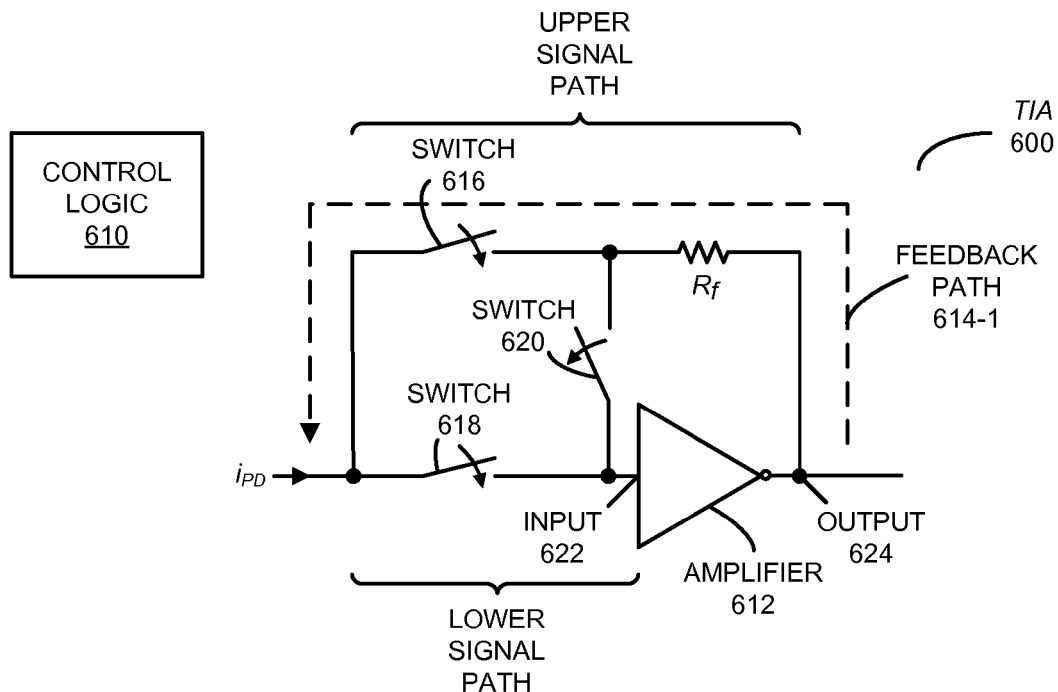
FIG. 7B is a block diagram illustrating the TIA in FIG. 6 during the normal mode in accordance with an embodiment of the present disclosure.

Additionally, as shown in FIG. 7B, which presents a block diagram of TIA 600, during the normal mode isolation switches 616 and 618 become transparent to electrically couple the upper signal path and the lower signal path to the OE converter, and bridging switch 620 becomes opaque to deactivate the inner feedback loop.

Note that the added resistance associated with isolation switch 618 does not significantly increase the equivalent input resistance of TIA 600 (i.e., $R_{TIA}$) because, during the normal mode, current flows mostly through the upper signal path. In some embodiments, the resistance associated with isolation switch 616 plus the resistance ($R_f$) in feedback path 614-1 may equal a pre-determined value so that a transimpedance gain of TIA 600 is unaffected by the presence of isolation switch 616. Additionally, note that isolation switches 616 and 618 may have different associated resistances. Thus, the resistance associated with isolation switch 618 may be smaller or larger than the resistance associated with isolation switch 616.

Moreover, the size (and, in particular, the width) of bridging switch 620 may be chosen to be small because it need not be fast (bridging switch 620 only needs to provide a DC-feedback path during the calibration). While this may increase the resistance associated with bridging switch 620, this added resistance may not affect the biasing of TIA 600, because no current flows through bridging switch 620 in the zero-current stable condition. Furthermore, because of its small size, bridging switch 620 may introduce an insignificant amount of parasitic capacitance, typically a value much smaller than the input capacitance of amplifier 612. Consequently, the effect of bridging switch 620 on the normal mode is negligible.

Figure 2A:
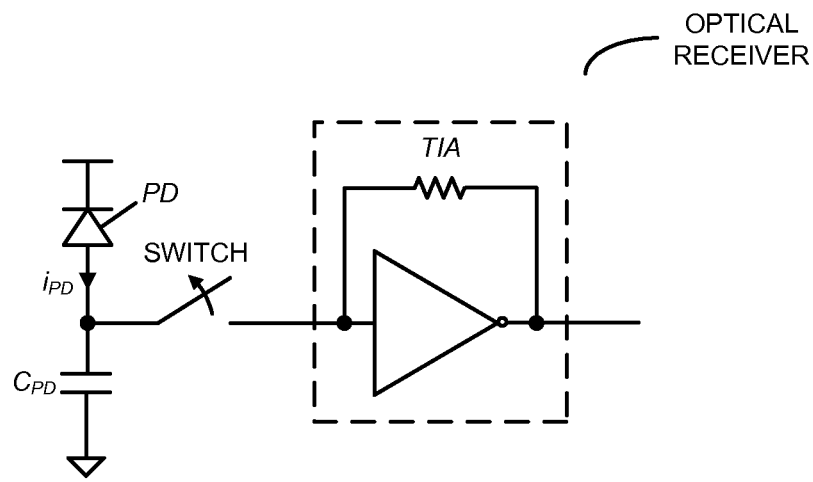
FIG. 2A is a block diagram illustrating a front end of an existing optical receiver during a calibration mode.
Figure 2B:
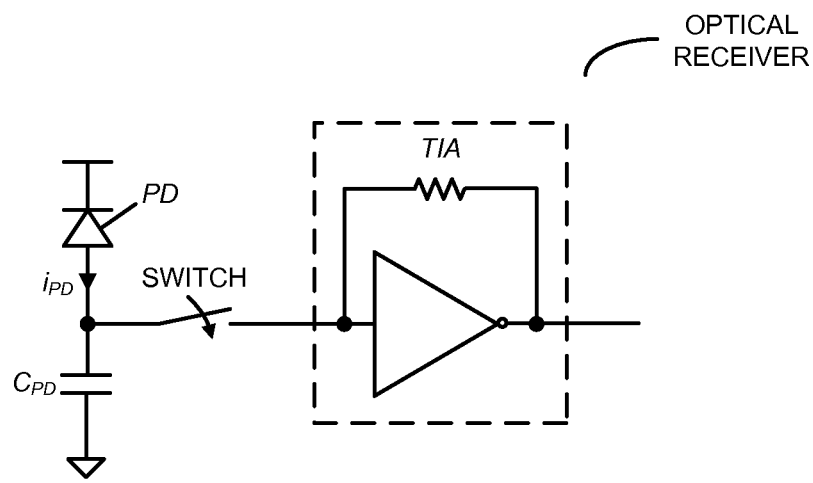
FIG. 2B is a block diagram illustrating a front end of an existing optical receiver during a normal mode.
Figure 3A:
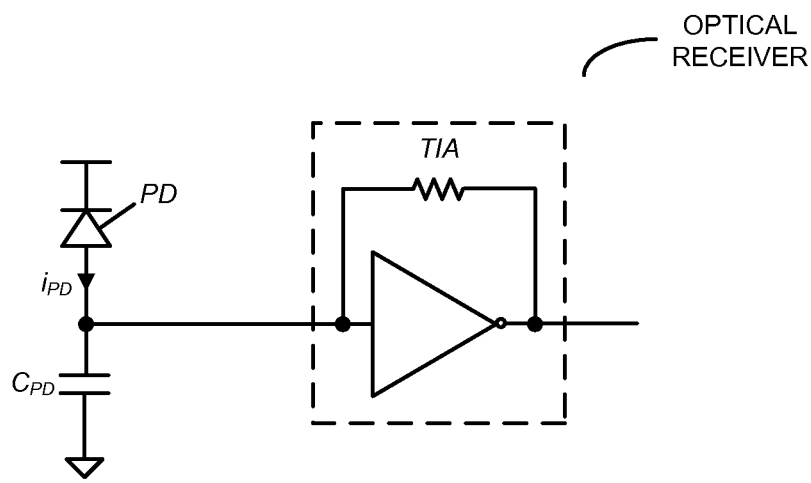
FIG. 3A is a block diagram illustrating a front end of an existing optical receiver.
Figure 3B:
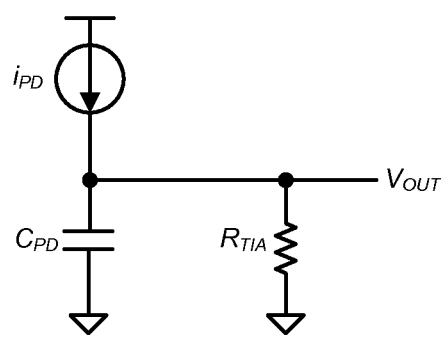
FIG. 3B is a block diagram illustrating an equivalent circuit for the front end of the existing optical receiver in FIG. 3A.
Figure 4A:
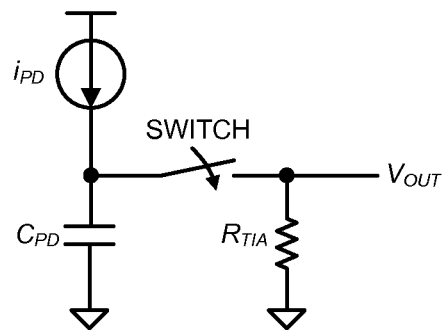
FIG. 4A is a block diagram illustrating an equivalent circuit for the front end of an existing optical receiver with an isolation switch during normal operation.
Figure 4B:
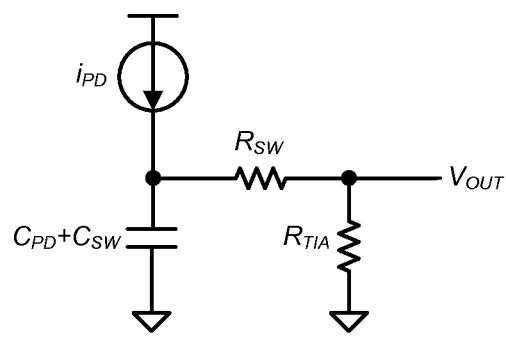
FIG. 4B is a block diagram illustrating an equivalent circuit for the front end of the existing optical receiver in FIG. 4A where the switch parasitics are shown explicitly.

In comparison with the single switch implementation shown in FIGS. 2A and 2B, isolation switches 616 and 618 can be relatively small. Furthermore, the effective resistance associated with isolation switch 616 is reduced by the Miller effect, while isolation switch 618 may only affect a pole set by the input capacitance of amplifier 612. Typically, this input capacitance is much smaller than $C_{PD}$. Thus, the input capacitance usually introduces a much higher frequency pole to the frequency response (or the closed-loop transfer function) of TIA 600 (and, thus, the optical receiver) than the dominant pole.

Consequently, a frequency response of TIA 600 during the normal mode may be substantially unchanged over an operating bandwidth of TIA 600 by the capability to electrically isolate input 622 of amplifier 612 during the calibration mode. For example, a change in the frequency response associated with electrically isolating input 622 of amplifier 612 during the calibration mode may correspond to a resistance associated with isolation switch 616 divided by a gain A of TIA's amplifier 612.

Figure 8:
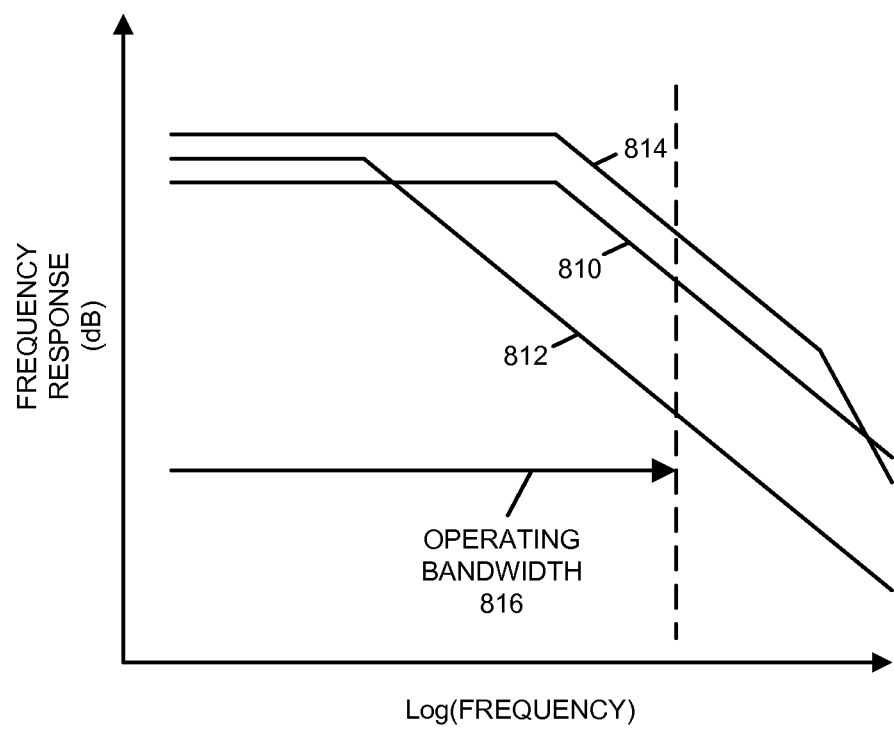
FIG. 8 is a block diagram illustrating frequency responses of optical receivers during the normal mode in accordance with an embodiment of the present disclosure.

Representative frequency-response (Bode) curves in the normal mode for three different optical receivers are shown in FIG. 8. The three frequency-response curves are slightly offset along they axis to avoid overlap. These frequency-response curves include: frequency response 810 corresponding to a TIA without an isolation technique; frequency response 812 corresponding to a TIA with a single switch separating the TIA from the PD and its associated parasitic capacitance; and frequency response 814 corresponding to a TIA with isolation switches 616 and 618 (FIG. 6) and bridging switch 620 (FIG. 6). Note that an operating bandwidth 816 of frequency responses 810 and 814 is approximately the same.

Figure 9:
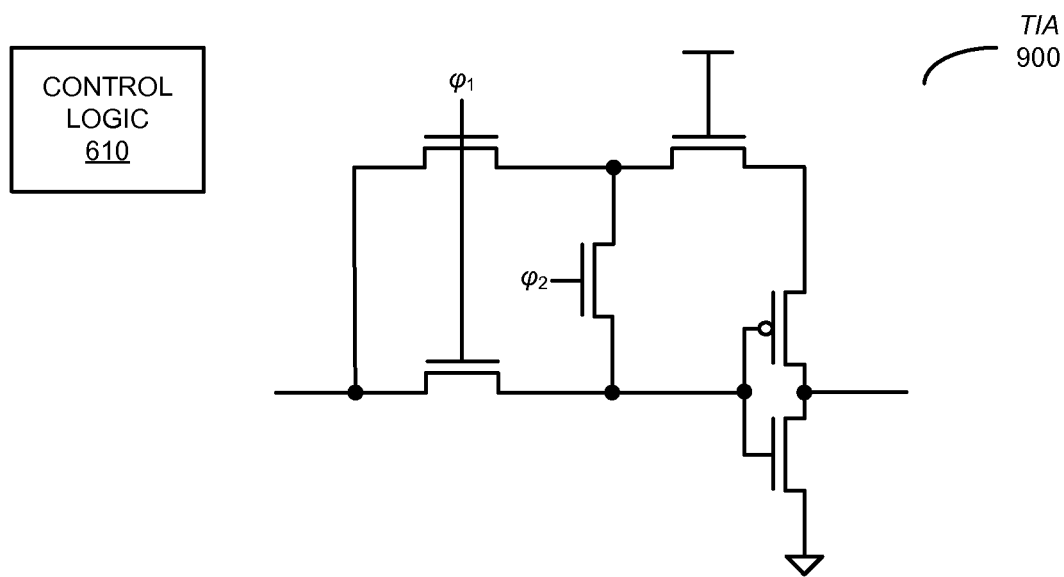
FIG. 9 is a block diagram illustrating a TIA in accordance with an embodiment of the present disclosure.

An exemplary embodiment of the TIA is shown in FIG. 9, which presents a block diagram of TIA 900. $\phi_1$ and $\phi_2$ are bits (provided by control logic 610) that control the operating mode of TIA 900. During the normal mode, $\phi_1$ is asserted and $\phi_2$ is deasserted so that TIA 900 is electrically coupled to the OE converter. During the calibration mode, $\phi_1$ is deasserted and $\phi_2$ is asserted so that TIA 900 is electrically decoupled from the OE converter, and the middle switch closes the feedback path for the zero-current condition.

The technique presented for calibrating and biasing an optical receiver may provide true isolation of the TIA from the analog electrical signal provided by the OE converter (e.g., the input current). This layer of isolation may facilitate a 'cleaner' calibration of the TIA. Moreover, by removing the input current, a more accurate estimation of the PD common-mode current can be made, which may simplify its removal. Because the parasitic resistances and capacitances introduced by the added switches are small, the frequency response of the TIA (and, thus, the optical receiver) is basically unaltered as compared to a TIA without isolation. In addition, note that this technique does not have the common requirement of operating with a data pattern that is DC balanced or with a data pattern that has a finite run-length limitation.

Figure 10:
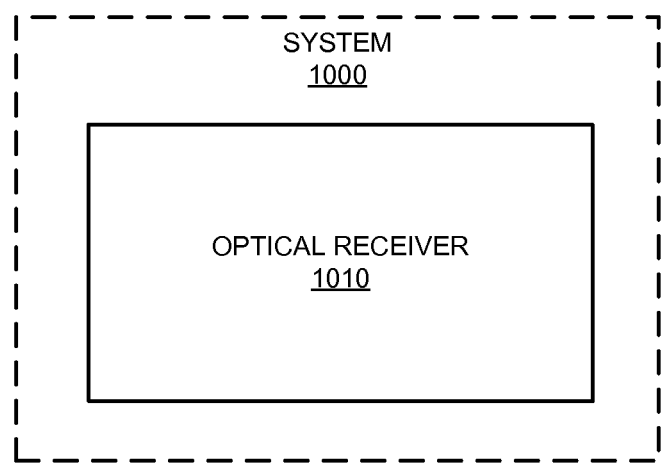
FIG. 10 is a block diagram illustrating a system that includes an optical receiver in accordance with an embodiment of the present disclosure.

One or more of the preceding embodiments of the optical receiver may be included in a system and/or an electronic device. This is illustrated in FIG. 10, which presents a block diagram illustrating a system 1000 that includes an optical receiver 1010.

The optical receiver may be used in a variety of applications, including: VLSI circuits, communication systems (such as WDM, an intra-chip optical link and/or an inter-chip optical link), storage area networks, data centers, networks (such as local area networks), and/or computer systems (such as multiple-processor-core computer systems). Note that system 1000 may include, but is not limited to: a server, a laptop computer, a communication device or system, a personal computer, a work station, a mainframe computer, a back plane, a blade, an enterprise computer, a data center, a portable-computing device, a supercomputer, a network-attached-storage (NAS) system, a storage-area-network (SAN) system, a switch, a hub, a bridge, a router, and/or another electronic computing device. Moreover, note that system 1000 may be at one location or may be distributed over multiple, geographically dispersed locations.

In some embodiments, one or more of the optical receivers may be included in a multi-chip module (MCM) (such as a switch or a multiple-core processor) and/or in a system that includes the MCM. This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled electrical signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

TIA 600 (FIG. 6), TIA 900 (FIG. 9) and/or system 1000 may include fewer components or additional components. Although these devices and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed.

Note that some or all of the functionality of TIA 600 (FIG. 6), TIA 900 (FIG. 9) and/or system 1000 may be implemented in one or more application-specific integrated circuits (ASICs) and/or one or more digital signal processors (DSPs). Furthermore, functionality in these embodiments may be implemented more in hardware and less in software, or less in hardware and more in software, as is known in the art. Additionally, the circuits in the preceding embodiments may be implemented using: complementary metal-oxide-semiconductor (CMOS), n-type metal-oxide-semiconductor (NMOS), p-type metal-oxide-semiconductor (PMOS) and/or bipolar junction transistors.

We now describe embodiments of the technique for calibrating and biasing an optical receiver. FIG. 11 presents a flow chart illustrating a method 1100 for calibrating and biasing an optical receiver, such as one of the preceding embodiments of the optical receiver. In this method, during the normal mode of the optical receiver, the input of the TIA in the optical receiver is electrically coupled to the OE converter in the optical receiver (operation 1110). Moreover, during the calibration mode of the optical receiver, the input of the TIA is electrically isolated from the OE converter while maintaining the feedback path from the output of the TIA to the input of the TIA's amplifier (operation 1112), thereby ensuring proper bias of the TIA during calibration. Note that the frequency response of the TIA during the normal mode is substantially unchanged over an operating bandwidth of the TIA by the capability to electrically isolate the input of the TIA from the OE converter during the calibration mode.

Referring to FIG. 6, in an exemplary embodiment of the technique for calibrating and biasing an optical receiver, switches 616, 618 and 620 in TIA 600 are used to selectively couple and/or decouple feedback path 614-1 in different locations during the calibration mode and the normal mode. In particular, during calibration, isolation switches 616 and 618 become opaque, and bridging switch 620 becomes transparent to obtain the zero-current condition. In this way, TIA 600 is still self-biased to obtain the maximum transimpedance gain. Then, amplifier 612 is adjusted to remove any offsets (i.e., a zero input correction may be adjusted). Moreover, isolation switches 616 and 618 subsequently become transparent, and bridging switch 620 becomes opaque. Next, an optical receiver transmits a predefined data pattern (such as one corresponding to a mid-level current approximately midway between a minimum and a maximum current output by the OE converter, or an alternating one-zero pattern) and the input biasing point of the amplification chain may be adjusted to center the output voltage swing 624.

In some embodiments of method 1100 there are additional or fewer operations. Moreover, the order of the operations may be changed and/or two or more operations may be combined into a single operation.

While the preceding embodiments illustrated the TIA in the context of an optical receiver, the TIA and the technique for calibrating and biasing may be used in a variety of circuits and applications, including those other than optical communication.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical receiver, comprising:
    an optical-to-electrical (OE) converter configured to receive an optical signal and to provide an analog electrical signal;
    a transimpedance amplifier (TIA), electrically coupled to the OE converter, having a normal mode and a calibration mode, wherein the TIA includes an amplifier;
    a decision circuit, electrically coupled to the TIA, configured to determine a digital electrical signal from the analog electrical signal; and
    control logic, electrically coupled to the TIA, configured to provide a signal that specifies an operating mode of the TIA, wherein the operating mode is one of the normal mode and the calibration mode;
    wherein, during the normal mode, the TIA is configured to electrically couple an input of the TIA to the OE converter;
    wherein, during the calibration mode, the TIA is configured to electrically isolate the input of the TIA from the OE converter while maintaining a feedback path from an output of the TIA to an input of the TIA, thereby ensuring proper bias of the TIA during calibration; and
    wherein a frequency response of the TIA during the normal mode is substantially unchanged over an operating bandwidth of the TIA by the capability to electrically isolate the input of the TIA from the OE converter during the calibration mode.

2. The optical receiver of claim 1, wherein the feedback path includes a feedback resistance; and
    wherein the TIA further includes:
        a first switch between a first node which is electrically coupled to the feedback resistance and a second node which is electrically coupled to the OE converter;
        a second switch between the second node and a third node which is electrically coupled to the input of the TIA's amplifier; and
        a third switch between the first node and the third node, wherein the first node is electrically coupled to the feedback resistance and the first switch, and the third node is electrically coupled to the second switch and the input of the TIA's amplifier.

3. The optical receiver of claim 2, wherein a change in the frequency response associated with electrically isolating the input of the TIA from the OE converter during the calibration mode corresponds to an added resistance associated with the first switch divided by a gain of the TIA's amplifier.

4. The optical receiver of claim 2, wherein the first switch is different than the second switch.

5. The optical receiver of claim 2, wherein a resistance associated with the first switch plus the feedback resistance equals a pre-determined value so that a gain and frequency response of the TIA is unaffected by the first switch.

6. The optical receiver of claim 2, wherein the reciprocal of the resistance-capacitance time constant associated with a resistance associated with the second switch is approximately an order of magnitude larger than a dominant pole of a closed-loop transfer function associated with the optical receiver.

7. The optical receiver of claim 2, wherein, during the calibration mode, the first switch and the second switch are opaque, and the third switch is transparent; and
    wherein, during the normal mode, the first switch and the second switch are transparent, and the third switch is opaque.

8. The optical receiver of claim 2, wherein, during the calibration mode, the control logic is configured to adjust a zero input condition for the TIA to reduce offsets associated with the TIA; and
    wherein, configuration in normal mode, allows further calibration using the optical signal corresponding to a predefined data pattern and the control logic is configured to adjust an output level of the TIA.

9. The optical receiver of claim 8, wherein the predefined data pattern corresponds to one of: a current approximately midway between a minimum and a maximum current output by the OE converter, an alternation zero-one sequence, an all-ones sequence, and an all-zeros sequence.

10. The optical receiver of claim 2, wherein a capacitance associated with the third switch is smaller than a capacitance associated with the input.

11. The optical receiver of claim 2, wherein, during the normal mode, the input is DC coupled to the OE converter.

12. A system,
    comprising an optical receiver, wherein the optical receiver includes:
    an OE converter configured to receive an optical signal and to provide an analog electrical signal;
    a TIA, electrically coupled to the OE converter, having a normal mode and a calibration mode, wherein the TIA includes an amplifier;
    a decision circuit, electrically coupled to the TIA, configured to determine a digital electrical signal from the analog electrical signal; and
    control logic, electrically coupled to the TIA, configured to provide a signal that specifies an operating mode of the TIA, wherein the operating mode is one of the normal mode and the calibration mode;
    wherein, during the normal mode, the TIA is configured to electrically couple an input of the TIA to the OE converter;
    wherein, during the calibration mode, the TIA is configured to electrically isolate the input of the TIA from the OE converter while maintaining a feedback path from an output of the TIA to an input of the TIA, thereby ensuring proper bias of the TIA during calibration; and wherein a frequency response of the TIA during the normal mode is substantially unchanged over an operating bandwidth of the TIA by the capability to electrically isolate the input of the TIA from the OE converter during the calibration mode.

13. The system of claim 12, wherein the feedback path includes a feedback resistance; and
wherein the TIA further includes:
a first switch between a first node which is electrically coupled to the feedback resistance and a second node which is electrically coupled to the OE converter;
a second switch between the second node and a third node which is electrically coupled to the input of the TIA's amplifier; and
a third switch between the first node and the third node, wherein the first node is electrically coupled to the feedback resistance and the first switch, and the third node is electrically coupled to the second switch and the input of the TIA's amplifier.

14. The system of claim 13, wherein a change in the frequency response associated with electrically isolating the input of the TIA from the OE converter during the calibration mode is affected by a resistance associated with the first switch divided by a gain of the TIA's amplifier.

15. The system of claim 13, wherein a resistance associated with the first switch plus the feedback resistance equals a pre-determined value so that a gain and frequency response of the TIA is unaffected by the first switch.

16. The system of claim 13, wherein the reciprocal of the resistance-capacitance time constant associated with a resistance associated with the second switch is approximately an order of magnitude larger than a dominant pole of a closed-loop transfer function associated with the optical receiver.

17. The system of claim 13, wherein, during the calibration mode, the first switch and the second switch become opaque, and the third switch becomes transparent; and
wherein, during the normal mode, the first switch and the second switch become transparent, and the third switch becomes opaque.

18. The system of claim 13, wherein, during the calibration mode, the control logic is configured to adjust a zero correction of the TIA to reduce the analog signal associated with offsets in the TIA; and
wherein, configured in the normal mode, an optical signal corresponds to a predefined data pattern and the control logic is configured to adjust an output level the TIA.

19. A method for calibrating and biasing an optical receiver, wherein the method comprises:
using at least one computer, performing operations for:
receiving, from control logic electrically coupled to a transimpedance amplifier (TIA), a signal that specifies an operating mode of the optical receiver, wherein the operating mode comprises a normal mode and a calibration mode;
during the normal mode, electrically coupling an input of the TIA in the optical receiver to an optical-to-electrical (OE) converter in the optical receiver, wherein the TIA includes an amplifier; and
during the calibration mode, electrically isolating the input of the TIA from an OE converter while maintaining a feedback path from an output of the TIA to an input of the TIA's amplifier, thereby ensuring proper bias of the TIA during calibration, wherein a frequency response of the TIA during the normal mode is substantially unchanged over an operating bandwidth of the TIA by the capability to electrically isolate the input of the TIA from the OE converter during the calibration mode.

20. The method of claim 19, further comprising determining, at a decision circuit that is electrically coupled to the TIA, a digital electrical signal from an analog electrical signal that is provided by the OE converter in response to an optical signal received at the OE converter.

* * * * *

UNITED STATES PATENT AND TRADEMARK OFFICE
CERTIFICATE OF CORRECTION

PATENT NO. : 8,582,985 B2 Page 1 of 1
APPLICATION NO. : 13/157165
DATED : November 12, 2013
INVENTOR(S) : Liu et al.

It is certified that error appears in the above-identified patent and that said Letters Patent is hereby corrected as shown below:

In the Specification

In column 1, line 28, delete "($i_{RD}$))." and insert -- ($i_{PD}$). --, therefor.

In column 2, line 9, after "$C_{large}$" insert -- , --.

Signed and Sealed this
Third Day of June, 2014

Michelle K. Lee
*Deputy Director of the United States Patent and Trademark Office*